(12) United States Patent
Liu

(10) Patent No.: US 8,664,329 B2
(45) Date of Patent: Mar. 4, 2014

(54) SILICONE-ACRYLIC COPOLYMER

(75) Inventor: Yuxia Liu, Dayton, NJ (US)

(73) Assignee: Henkel US IP LLC, Rocky Hill, CT (US)

( * ) Notice: Subject to any disclaimer, the term of this patent is extended or adjusted under 35 U.S.C. 154(b) by 0 days.

(21) Appl. No.: 13/617,968

(22) Filed: Sep. 14, 2012

(65) Prior Publication Data

US 2013/0012653 A1    Jan. 10, 2013

Related U.S. Application Data

(63) Continuation of application No. PCT/US2011/032609, filed on Apr. 15, 2011.

(60) Provisional application No. 61/327,141, filed on Apr. 23, 2010.

(51) Int. Cl.
| | |
|---|---|
| C08G 77/38 | (2006.01) |
| C09J 183/00 | (2006.01) |
| C08L 7/00 | (2006.01) |
| C08L 83/00 | (2006.01) |

(52) U.S. Cl.
USPC ............ 524/588; 525/105; 525/244; 525/451

(58) Field of Classification Search
None
See application file for complete search history.

(56) References Cited

U.S. PATENT DOCUMENTS

| | | | |
|---|---|---|---|
| 3,650,813 A | 3/1972 | Nordstrom et al. | |
| 4,446,259 A * | 5/1984 | Vasta | 523/408 |
| 4,632,968 A * | 12/1986 | Yokota et al. | 526/279 |
| 4,655,767 A | 4/1987 | Woodard et al. | |
| 4,684,538 A * | 8/1987 | Klemarczyk | 427/515 |
| 4,711,943 A * | 12/1987 | Harvey, III | 526/279 |
| 4,785,035 A * | 11/1988 | Palluel et al. | 524/101 |
| 4,898,920 A | 2/1990 | Lee et al. | |
| 5,063,254 A * | 11/1991 | Nakos | 522/43 |
| 5,308,887 A * | 5/1994 | Ko et al. | 522/148 |
| 5,482,988 A | 1/1996 | Ulman et al. | |
| RE35,474 E | 3/1997 | Woodward et al. | |
| 5,624,763 A * | 4/1997 | Melancon et al. | 428/461 |

(Continued)

FOREIGN PATENT DOCUMENTS

| | | |
|---|---|---|
| EP | 0667382 A1 | 8/1995 |
| WO | 2007050580 A2 | 5/2007 |
| WO | 2007145996 A2 | 12/2007 |

OTHER PUBLICATIONS

International Search Report and Written Opinion, dated Dec. 27, 2011, International Application PCT/US2011/032609. All references cited in the International Search Report and Written Opinion are listed above.

*Primary Examiner* — Robert S Loewe
(74) *Attorney, Agent, or Firm* — Sun Hee Lehmann

(57) ABSTRACT

A novel silicone-acrylic copolymer which comprises a covalently bonded silicone polymer with an acrylic polymer through the —Si—O—Si— linkage is described. The silicone-acrylic copolymer is a reaction product of (a) a silicone polymer, (bi) a mixture of acrylic monomers wherein at least one acrylic monomer comprises a silane (meth)acrylic monomer and/or a siloxane (meth)acrylic macromer with a radical initiator to form an acrylic prepolymer or (bii) an acrylic polymer which comprises a silane or a siloxane functional group; and (c) a scrambling catalyst, wherein the ratio of the silicone polymer (a) and the mixture of acrylic monomers (bi) or polymer (bii) is from 50:1 to 1:50. The silicone-acrylic copolymer is useful as an adhesive, sealant, coating, and the like.

17 Claims, 3 Drawing Sheets

GPC chromatograms of silicone polymer (· · ·), acrylic polymer (----), and the silicone-acrylic copolymer of (—)

(56) References Cited

U.S. PATENT DOCUMENTS

| | | | |
|---|---|---|---|
| 5,663,215 A * | 9/1997 | Milligan | 523/122 |
| 5,719,234 A * | 2/1998 | Yabuta et al. | 525/101 |
| 5,760,100 A * | 6/1998 | Nicolson et al. | 523/106 |
| 5,789,485 A | 8/1998 | Kobayashi et al. | |
| 5,852,095 A * | 12/1998 | Yamauchi et al. | 524/460 |
| 5,939,477 A | 8/1999 | Pretzer et al. | |
| 5,958,446 A | 9/1999 | Miranda et al. | |
| 6,235,306 B1 | 5/2001 | Miranda et al. | |
| 6,943,203 B2 * | 9/2005 | Vanderlaan et al. | 523/107 |
| 7,026,400 B2 * | 4/2006 | Yeats et al. | 525/100 |
| 7,408,012 B1 * | 8/2008 | Kneafsey et al. | 526/279 |
| 7,445,848 B2 * | 11/2008 | Nixon | 428/447 |
| 2004/0152859 A1 * | 8/2004 | Kunzler et al. | 528/25 |
| 2006/0293456 A1 * | 12/2006 | Saito et al. | 525/192 |
| 2009/0196911 A1 * | 8/2009 | Loubert et al. | 424/449 |

* cited by examiner

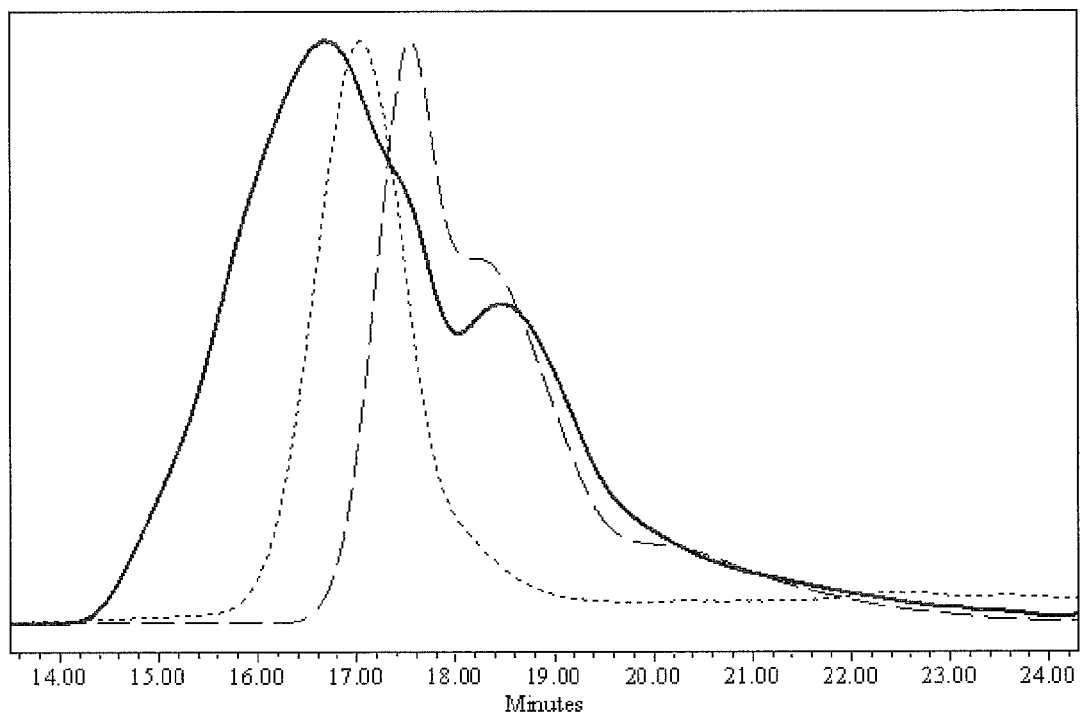
Figure 1: GPC chromatograms of silicone polymer (······), acrylic polymer (----), and the silicone-acrylic copolymer of (——)

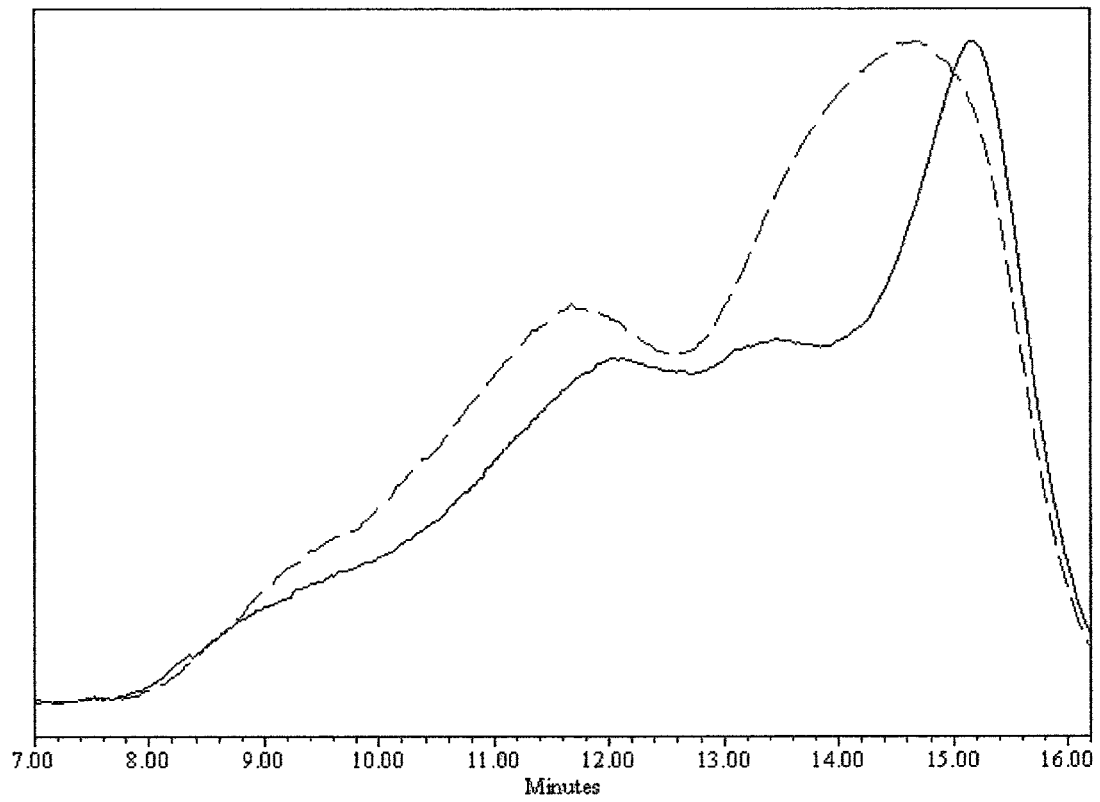
Figure 2: GPC chromatograms of Example 14 (----) and Example 13 (———)

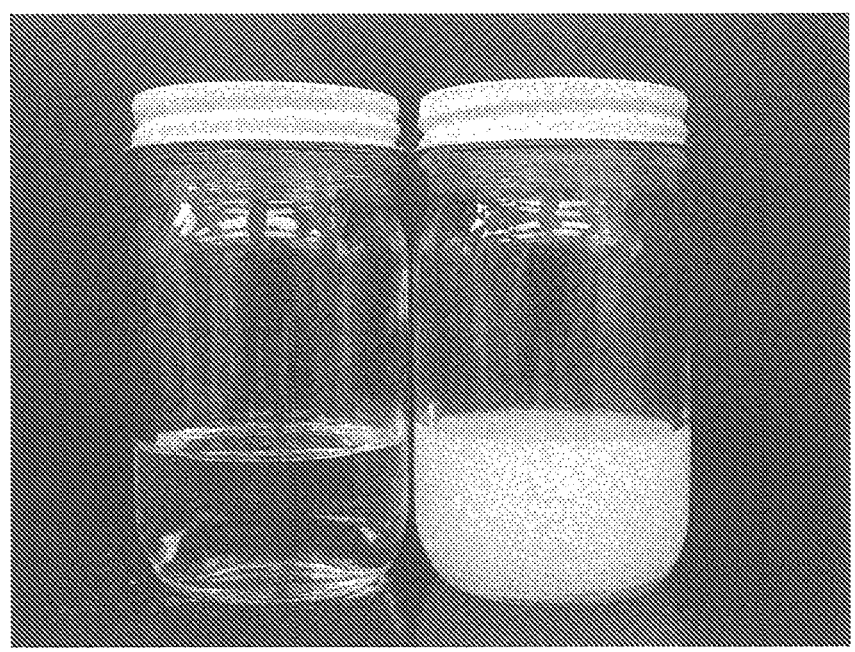
Figure 3: Photographs of Example 14 in heptane (left) Example 13 in heptane (right)

SILICONE-ACRYLIC COPOLYMER

CROSS-REFERENCE TO RELATED APPLICATIONS

This application is a continuation of International Patent Application No. PCT/US2011/032609 filed Apr. 15, 2011, which claims the benefit of U.S. Provisional Patent Application No. 61/327,141 filed Apr. 23, 2010, the contents of both of which is incorporated herein by reference.

FIELD OF THE INVENTION

The invention relates to silicone-acrylic copolymers and compositions comprising the copolymers and end use applications thereof.

BACKGROUND OF THE INVENTION

Acrylic-based polymers have been broadly used as adhesives, coatings and sealants since they are relatively low in cost, adhere well to a variety of different surfaces and, if necessary, can be formulated to build adhesion to a surface. The disadvantages of acrylic-based polymers include poor high temperature performance, poor low temperature performance, inability to adhere to substrates with low surface energies and the potential to build excessive adhesion to substrates with high surfaces energies.

Silicone-based polymers exhibit both good high and low temperature performance as adhesives, coatings and sealants. Silicone-based polymers have excellent chemical inertness, electrical insulating properties, biocompatibility, and the ability to adhere to low surface energy substrates. A primary disadvantage of silicone-based polymers is their high cost compared to other types of technologies. Other limitations include lower tack and limited adhesion build, when necessary, in comparison to acrylic-based polymers.

While individual silicone adhesive and acrylic polymer have distinct advantages, and although they may be physically blended to form a hybrid polymer system, the blend is thermodynamically unstable and ultimately leads to macroscopic phase separation and change in the blend properties over time.

An attempt to overcome this incompatibility has been addressed in WO 2007/145996, which forms an acrylic grafted silicone adhesive by a complex process. However, this complex process makes removal of residual monomer difficult and the level of crosslinking cannot be well controlled. If any unreacted silicone and acrylic components remain, this unreacted components lead to phase separation over time, even if the rest of components are covalently grafted.

Covalent grafting of silicone and acrylics may be formed by reacting a silicone polymer and an acrylic polymer, however, a silicone resin is necessary to form a hybrid polymer system. The resultant hybrid polymer system forms silicone resin as the center domain and silicone polymer and acrylics are attached to that domain. Hence, the resultant hybrid polymer system requires the silicone resin as the center domain to form a lattice-type polymer.

There is a need in the art for adhesives, coatings and sealants that exhibit the advantages of both acrylic- and silicone-based technologies without the disadvantages inherent in the prior art. This invention addresses this need.

SUMMARY OF THE INVENTION

The present invention describes a novel silicone-acrylic copolymer comprising a covalently bonded silicone polymer with an acrylic polymer through the —Si—O—Si— linkage.

One embodiment is directed to a silicone-acrylic copolymer comprising a silicone polymer and an acrylic polymer which are covalently bonded through a —Si—O— linkage, wherein the ratio of the silicone polymer and the acrylic monomer is from 50:1 to 1:50, and the acrylic polymer contains at least one silane or siloxane functional group.

In a further embodiment, a silicone-acrylic copolymer which comprises a reaction product of a silicone polymer, a mixture of acrylic monomers wherein at least one acrylic monomer comprises a silane (meth)acrylic monomer and/or a siloxane (meth)acrylic macromer, a radical initiator; and a scrambling catalyst, wherein the ratio of the silicone polymer and the acrylic monomer is from 50:1 to 1:50.

Yet in another embodiment, a silicone-acrylic copolymer comprises a reaction product of a silicone polymer, an acrylic polymer which comprises a silane or a siloxane functional group, and a scrambling catalyst, wherein the ratio of the silicone polymer and the acrylic polymer is from 50:1 to 1:50.

Another embodiment is directed to a method of making a silicone-acrylic copolymer comprising the steps of reacting a silane (meth)acrylic monomer and/or a siloxane (meth)acrylic macromer in the presence of a radical initiator and a solvent to form an acrylic prepolymer, adding a silicone polymer and a scrambling catalyst in the solvent, and removing the solvent.

In a further embodiment, a silicone-acrylic copolymer is prepared by reacting a silicone polymer with an acrylic polymer that contains at least one silane and/or siloxane functional group in the presence of a scrambling catalyst and a solvent.

Yet another embodiment is directed to a composition comprising the silicone-acrylic copolymer.

Another embodiment is directed to an article comprising the silicone-acrylic copolymer. The article may be formed into a solution adhesive, a water-born adhesive or a hot melt adhesive.

BRIEF DESCRIPTION OF THE FIGURES

FIG. 1 is GPC chromatograms of silicone polymer ( . . . ) acrylic polymer (----) and silicone-acrylic copolymer (—).

FIG. 2 is GPC chromatograms of the adhesives made from (1) silicone-acrylic copolymer with MQ resin (----) and (2) silicone polymer, acrylic polymer and MQ resin (—).

FIG. 3 is a photograph of an adhesive made from silicone-acrylic copolymer with MQ resin (left, clear solution) and an adhesive made from silicone polymer, acrylic polymer and MQ resin (right, opaque solution).

DETAILED DESCRIPTION OF THE INVENTION

Percent by weight means, unless expressly stated otherwise, percent dry weight.

The invention provides a silicone-acrylic copolymer comprising a covalently bonded silicone polymer with an acrylic polymer through the —Si—O—Si-linkage, and the acrylic polymer contains at least one silane (meth)acrylic monomer and/or a siloxane (meth)acrylic macromer, and the copolymer comprising a covalently bonded silicone polymer with an acrylic polymer through the —Si—O—Si— linkage.

The copolymer is prepared by reacting a mixture of a silicone polymer and mixtures of acrylic monomers that comprises at least one silane (meth)acrylic monomer and/or a siloxane (meth)acrylic macromer, with a radical initiator and a scrambling catalyst. The ratio of the silicone polymer to the acrylic monomer is from 50:1 to 1:50.

The copolymer is also prepared by reacting a mixture of a silicone polymer and an acrylic polymer that comprises at least one silane (meth)acrylic monomer and/or a siloxane (meth)acrylic macromer with a scrambling catalyst. The ratio of the silicone polymer to the acrylic monomer is also from 50:1 to 1:50.

Useful silicone polymers that can be used in the practice of the invention include silicone polymers that comprise an organosubstituted polysiloxane. Diorgano substituents include, for example, dimethyl, methylvinyl, methylphenyl, diphenyl, methylethyl, and 3,3,3-trifluoropropyl. In one embodiment, the diorgano substitutes are all dimethyl substituents. The silicone polymer will typically be end-capped with functional groups such as hydroxyl, alkoxyl, hydride, vinyl functional groups, and like groups. In one embodiment, end-capped functional groups are hydroxyl groups, alkoxy functional groups, hydride functional groups, vinyl functional groups or mixtures thereof. The molecular weight of polydiorganosiloxane will typically range from about 100 to about 2,000,000, preferably, from about 20,000 to about 150,000 g/mol.

Acrylic monomers of the invention include at least one silane (meth)acrylic monomer and/or a siloxane (meth)acrylic macromer.

Examples of silane (meth)acrylic monomer include trialkoxylsilyl (meth)acrylates, dialkoxysilyl (meth)acrylates, and the like. The silane (meth)acrylic monomer will typically be used in amounts of from 0.2 to 50 weight percent of the total weight of the acrylic polymer, more preferably the amount of silane (meth)acrylic monomer will range from about 1.0 to about 10 weight percent of the acrylic polymer.

Examples of siloxane (meth)acrylic macromer include polydimethylsiloxane mono (meth)acrylate, e.g. trialkoxylsilyl (meth)acrylates, dialkoxysilyl (meth)acrylates or methacrylates. Preferred siloxane (meth)acrylic macromers are trimethoxylsilyl and dimethoxymethylsilyl functional acrylates or methacrylates. An example of such monomer is methacryloxypropyl trimethoxylsilane. The siloxane (meth)acrylic macromer is in the content of about 0.2 to 50 weight percent based on the total weight of acrylic monomers.

Other acrylic monomers are selected from a group of alkyl (meth)acrylate monomers. Preferred alkyl (meth)acrylates that may be used to practice the invention have up to about 18 carbon atoms in the alkyl group, preferably from 1 to about 12 carbon atoms in the alkyl group. These acrylic polymer components may comprise a low glass transition temperature (Tg) alkyl acrylate monomer. Low Tg monomers are those having a homopolymer Tg of less than about 0° C. Preferred low Tg alkyl acrylates for use in the invention have from about 4 to about 10 carbon atoms in the alkyl group and include butyl acrylate, methyl acrylate, methyl methacrylate, t-octyl acrylamide, hydroxyethyl acrylate and acrylic acid, hydroxypropyl acrylate, hydroxylpropyl methacrylate, amyl acrylate, hexyl acrylate, 2-ethylhexyl acrylate, octyl acrylate, isooctyl acrylate, decyl acrylate, isomers thereof, and combinations thereof. Particularly preferred are butyl acrylate, 2-ethylhexyl acrylate and isooctyl acrylate.

The low Tg acrylic monomers are preferably, but not necessarily, present in amounts greater than about 40 wt % based upon the total monomer weight of the acrylic polymer. The acrylic polymer components may further comprise (meth) acrylate monomers having a high glass transition temperature. Non-limiting examples include methyl acrylate, ethyl acrylate, methyl methacrylate and isobutyl methacrylate. It will be understood by a skilled practitioner that the choice of monomers is dictated by consideration of adhesive properties, compatibility with the other adhesive matrix components, drug solubility and so forth. Thus the monomer Tg is only one of many variables to be taken into account in any particular polymer design.

Useful acrylic monomers may be a nitrogen containing compound, in particular N-substituted acrylamides or methacrylamides. Examples include N-vinyl pyrrolidone, N-vinyl caprolactam, N-tertiary octyl acrylamide, dimethyl acrylamide, diacetone acrylamide, N-tertiary butyl acrylamide, N-isopropyl acrylamide, cyanoethylacrylate, N-vinyl acetamide and N-vinyl formamide.

Useful acrylic monomers may also be selected from a group of one or more hydroxyl containing functional monomers such as 2-hydroxyethyl acrylate, 2-hydroxyethyl methacrylate, hydroxypropyl acrylate and/or hydroxypropyl methacrylate. Such hydroxy functional monomers are generally used in amounts up to about 40 wt %, more typically from about 0.5 to about of 10 wt %, based on the total monomer weight of the acrylic polymer.

Useful acrylic monomers, if desired, may be selected from a group of carboxylic acid functional monomers. Useful carboxylic acids preferably contain from about 3 to about 6 carbon atoms and include, among others, acrylic acid, methacrylic acid, itaconic acid, β-carboxyethyl acrylate and the like. Acrylic acid is particularly preferred. Such carboxy functional monomers are generally used in amounts up to about 25 wt %, more typically from about 0.5 to about of 10 wt %, based on the total monomer weight of the acrylic polymer.

Comonomers may be added to the acrylic monomers. Useful comonomers include vinyl acetate, styrene, alkyl di(meth) acrylates, glycidyl methacrylate and allyl glycidyl ether, as well as macromers such as, for example, poly(styryl)methacrylate.

Radical initiators are added with the acrylic monomers to form an acrylic prepolymer. While a particular polymerization method is described in the examples, the acrylic polymer component of the present invention may be prepared by conventional polymerization methods familiar to those of skill in the art. These methods include, without limitation solution polymerization, suspension polymerization, bulk polymerization and emulsion polymerization. In the practice of the invention, it may also be advantageous to reduce the residual monomer content, or remove or reduce solvent levels and/or other volatiles, following polymerization using methods that are known and conventional in the art. The adhesive may be applied from organic solution, aqueous dispersion, or from a melt.

Acrylic prepolymer may be formed as described above, or acrylic polymer may be used directly to form the silicone-acrylic copolymer. The acrylic polymer of the invention contains at least an alkoxysilyl functional monomer or/and polysiloxane-containing macromer. Examples of polysiloxane-containing macromers include polydimethylsiloxane mono acrylates or mono methacrylates.

The amount of polysiloxane-containing (meth)acrylic macromer will typically be used in amounts of from 0.2 to 50 weight percent, more preferably, 1 to 15 weight percent of the acrylic polymer.

Other acrylic polymer that can advantageously be used in the practice of the invention are acrylic polymers comprising end-capped alkoxysilyl functional groups or polysiloxane-blocked or -grafted copolymers. Examples of the end-capped alkoxysilyl functional groups are trialkoxylsilyl, dialkoxysilyl functional groups. Preferred end-capped alkoxysilyl functional groups are trimethoxylsilyl, dimethoxymethylsilyl, triethoxylsilyl and/or diethoxymethylsilyl functional groups. Examples of such polymers are MS-polymer (Kaneka).

Block copolymers are also useful. An example of a polysiloxane block copolymer is polydimethylsiloxane-acrylic block copolymer. The preferred amount of siloxane block is 10 to 50 weight percent of the whole block polymer.

One acrylic polymer component that can be used in the practice of the invention is an acrylic polymer that comprises from about 90 to about 99.5 wt % of 2-ethylhexyl acrylate and from about 0.5 to about 10 wt % of dimethoxymethylsilyl methacrylate.

It has been discovered that polymers comprising greater than about 0.2 wt % of alkoxysilyl functional monomers are particularly well suited for use in adhesive compositions of the invention and can be used in the production of adhesive goods such as, for example, adhesive tapes and adhesive sheets by applying an adhesive or adhesive composition to a base material such as paper, cloth or plastic film.

The ratio of the silicone polymer and the acrylic monomer and/or polymer is from 50:1 to 1:50.

One preferable polymerization method is to form the silicone-acrylic copolymer by starting the polymerization of acrylic monomers in the presence of a radical initiator, a solvent and the silicone polymer. At the end of radical polymerization, a scrambling catalyst is introduced and the acrylic polymer reacts with the silicone polymer in the same reaction vessel to produce the copolymer. The alkoxysilyl functional monomers, once incorporated onto the acrylic polymer backbone, undergo condensation reactions with end-capped OH functional groups of the silicone polymer and fast re-equilibrated with a dynamic —Si—O—Si— bond cleavage and reformation in the presence of water/moisture and a strong acid or base catalyst. This step is called "a scrambling reaction," since it leads to completely miscible of the two intrinsically immiscible polymers: silicone polymer and acrylic polymer. The alkoxysilyl functional groups of the acrylic polymer undergo a self-crosslinking reaction in the presence of water/moisture and the catalyst from the scrambling reaction.

In another preferred polymerization method, the scrambling catalyst is introduced to the silicone polymer and acrylic polymer in the same reaction vessel to produce the copolymer. Again, the scrambling reaction takes place and results in the copolymer.

The useful scrambling catalysts have a pKa value less than or equal to −6 or greater than or equal to 15.

Examples of the scrambling catalyst are KOH, NaOH, LiOH, organolithium reagents, Grignard reagents, methanesulfonic acid, sulfuric acid, acidic clay, acidic ion exchange resins, and mixtures thereof. Other examples of the catalyst include organometallic salts of metals such as tin, titanium, aluminum, bismuth. Combination of more than one type of catalysts above can also be used.

Scrambling reaction may take place at room temperature, one preferred method is to conduct either reaction with heating at 50-160° C. The preferable temperature for the scrambling step is between 100-150° C. Scrambling reaction is preferably allowed to proceed at least until the rate of evolution of condensation byproducts, such as water, alcohol, and carbodioxide, is substantially removed. Heating is continued until the desired physical properties such as viscosity, clarity of the solution, and adhesion values are obtained. Typically the mixture of each step will be allowed to react from about 1 to about 24 hours.

The preferably solvent or a co-solvent is selected from the group consisting of aliphatic hydrocarbons, aromatic hydrocarbons, ether, tetrahydrofuran, ethyl acetate, methyl ethyl ketone, water and mixtures thereof.

Another embodiment is directed to a composition comprising the silicone-acrylic copolymer. The silicone-acrylic copolymer may be formulated into a variety of adhesives including a solution adhesive, emulsion adhesive and hot melt adhesive. Additional components may be added to the silicone-acrylic copolymer to form desired properties.

The silicone-acrylic copolymer may be blended with additional components to form a composition such as an adhesive, coating, sealant, and the like. Additional components may be blended with the copolymer of the invention to further increase or decrease desired property of the composition. Such components include silicone resin, tackifying agents, solubilizing agents, additives, antioxidants, polyester, polyether, polyurethane, natural rubber, synthetic rubber, viscosity modifying agents, fillers, and the like.

Useful silicone resin components that can be used in the practice of the invention include silicone resins that contain 0.05 to 5 weight percent of silicone-bound hydroxyl group and comprise triorganosiloxy units of $R_3SiO_{1/2}$ and tetrafunctional siloxyl units of $SiO_{4/2}$ in a mole ratio of from 0.5-1.5 $R_3SiO_{1/2}$ units for each $SiO_{4/2}$. The silicone resin may be blended with the silicone-acrylic copolymer, in a solid form or in a solution with toluene, xylene or heptane, and the like. Preferred organic R groups of the silicone resin are methyl, hydroxyl, vinyl, phenyl, (meth)acryloxy, and mixtures thereof. One preferred R group is a methyl group. The resins can be also further treated with $Me_3SiOSiMe_3$, $ViMe_2SiOSiMe_2Vi$, $MeViPhSiOSiPhViMe$, $Me_3SiNHSiMe_3$ or triorganosilane such as $Me_3SiCl$, $Me_2ViSiCl$ or $MeViPhSiCl$ to reduce the amount of OH in the silicone resin.

The addition of a silicone resin to the copolymer of the invention results in a different composition than adding silicon resin to silicone polymer and acrylic polymer that have not formed into a copolymer. While not bound to any theory, in the latter composition, the silicone resin forms the center domain which bridges the silicone polymer and acrylic polymer. These compositions are thermodynamically unstable and will ultimately lead to microscopic, or even macroscopic, phase separation over time. For composition made with the copolymer, the reactive sites on the silicone polymer has already reacted with acrylic monomers/polymers, and hence, the silicone resin does not form the center domains or bridge domains to connect the acrylic polymer and silicone polymer in the hybrid adhesive of the invention.

The addition of silicone resin to the silicone-acrylic copolymer is considered as a "bodying reacting" and is conducted in the presence of a bodying catalyst. Examples of the bodying catalyst for this bodying reaction is $(NH_4)_2CO_3(s)$, ammonium carbamate, $NH_4OH(aq)$, methanesulfonic acid, sulfuric acid, acidic clay, acidic Amberlyst™ ion exchange resins (Rohm and Haas), KOH, NaOH, LiOH, n-BuLi, and mixtures thereof. While the bodying reactions may take place at room temperature, one preferred method is to conduct the reaction with heating at 50-160° C. The preferable temperature of the bodying step is between 40-150° C.

The bodying reaction is preferably allowed to proceed at least until the rate of evolution of condensation byproducts, such as water, alcohol, and carbodioxide, is substantially removed. Heating can be continued until the desired physical properties such as viscosity, clarity of the solution, and adhesion values are obtained. Typically the mixture of each step will be allowed to react from about 1 to about 24 hours. When the bodying step of reaction is complete, the solids content of the resulting composition can be adjusted by adding or removing solvent.

Suitable tackifying agents are those known in the art including: (1) aliphatic hydrocarbons; (2) mixed aliphatic and aromatic hydrocarbons; (3) aromatic hydrocarbons; (4) substituted aromatic hydrocarbons; (5) hydrogenated esters; (6) polyterpenes; (7) mineral oils; and (8) wood resins or rosins and hydrogenated forms thereof. Useful levels of tackifiers are generally from about 1 wt % to about 30 wt % based on the weight of the total composition.

The copolymers of the invention may also be blended with additional polymers to enhance desired properties. Examples of polymers useful for blending include, but are not limited to, other acrylates, polysiloxanes, polyisobutylene, polyester, PPO, polyisoprene, polybutadiene, styrenic block polymers, and the like. Examples of styrenic block copolymers include, but are not limited to, styrene-isoprene-styrene block copolymer (SIS), styrene-butadiene-styrene copolymer (SBS), styrene-ethylenebutene-styrene copolymers (SEBS), and diblock analogs thereof.

The compositions of the invention may include other additives known to those skilled in the art. These additives may include, but are not limited to, pigments, fillers, fluorescent additives, flow and leveling additives, wetting agents, surfactants, antifoaming agents, rheology modifiers, permeation enhancers, stabilizers, and antioxidants.

Antioxidants may be added singly or in combination to protect the components against degradation during preparation and use of the adhesive compositions, and to ensure long-term thermal stability. In general up to about 1% by weight of one or more antioxidants may be included in the adhesive compositions, usually, from about 0.1% to about 0.5% by weight.

Additional polymers may be further blended with the silicone-acrylic copolymers. Examples of such polymer include polyester, polyether, polyurethane, natural rubber, synthetic rubber, and the like.

EXAMPLES

Example 1

An initial charge containing 20.0 g of butyl acrylate, 5.0 g of methyl methacrylate, 0.5 g of trimethoxysilylpropylacrylate, 40.8 g of silicone polymer (Wacker Elastomer 80 N), 0.05 g of Vazo-67(2,2'-azodi(2-methylbutyronitrile)), and 50.0 g of xylene was mixed and charged to a 500-mL 4-neck round bottom flask equipped with stainless steel stirrer, thermometer, water bath, and slow addition funnels. The initial charge was heated to reflux while stirring. After 15 minutes of reflux, 30 g of xylene and 0.3 g of Vazo-67 was added over a period of 2 hours. At the end of the addition, 0.1 g of KOH (1.0 N in water) was added and the mixture was stirred at reflux for 4 hour. At the end of the hold period, the contents were cooled to room temperature and the polymer solution was discharged. Xylene was removed by rotorary evaporation under vacuum and heptane was added to reach a solid content of 50%.

Example 2

An initial charge containing 98.0 g of 2-EHA, 2.0 g of trimethoxysilylpropylacrylate, 400.0 g of silicone polymer (Wacker Elastomer 80 N), 0.07 g of vazo-67, and 650.0 g of heptane was mixed and charged to a 2-L 4-neck round bottom flask equipped with stainless steel stirrer, thermometer, condenser, water bath, and slow addition funnels. The initial charge was heated to reflux while stirring. After 15 minutes of reflux, 50 g of heptane and 0.5 g of Vazo-67 were added over a period of 2 hours. At the end of the addition, 0.2 g of KOH (1.0 N in water) was added and the mixture was stirred at reflux for 4 hour. At the end of the hold period, the content was cooled to room temperature and the polymer solution was discharged. Part of the heptane was removed by rotorary evaporation under vacuum, adjusting the solids content to 50%.

Example 3

An initial charge containing 20.0 g of 2-EHA, 5.0 g of methyl acrylate, 0.5 g of trimethoxysilylpropylacrylate, 0.05 g of vazo-67, and 50.0 g of xylene was mixed and charged to a 500-mL 4-neck round bottom flask equipped with stainless steel stirrer, thermometer, condenser, water bath, and slow addition funnels. The initial charge was heated to reflux while stirring. After 15 minutes of reflux, 30 g of xylene and 0.3 g of Vazo-67 was added over a period of 2 hours. At the end of the addition, 0.1 g of KOH (1 N in water), and 40.8 g of silicone polymer (Wacker Elastomer 80 N) were added and the mixture was stirred at reflux for 4 hour. At the end of the hold period, the contents were cooled to room temperature and the polymer solution was discharged. Xylene was removed by rotorary evaporation under vacuum and heptane was added, adjusting the solids content to 50%.

Example 4

An initial charge containing 98.0 g of 2-EHA, 2.0 g of trimethoxysilylpropylacrylate, 0.07 g of vazo-67, and 1.0 L of heptane were mixed and charged to a 2-L 4-neck round bottom flask equipped with stainless steel stirrer, thermometer, condenser, water bath, and slow addition funnels. The initial charge was heated to reflux while stirring. After 15 minutes of reflux, 50 g of heptane and 0.5 g of Vazo-67 were added over a period of 2 hours. At the end of the addition, 0.2 g of KOH (1.0 N in water) and 400.0 g of silicone polymer (Wacker Elastomer 80 N) were added and the mixture was stirred at reflux for 4 hour. At the end of the hold period, the content was cooled to room temperature and the polymer solution was discharged. Some heptane was removed by rotorary evaporation under vacuum, adjusting the solids content to 50%.

Example 5

An initial charge containing 98.0 g of 2-EHA, 2.0 g of trimethoxysilylpropylacrylate, 0.07 g of Vazo-67, and 80.0 g of heptane were mixed and charged to a 500-mL 4-neck round bottom flask equipped with stainless steel stirrer, thermometer, condenser, water bath, and slow addition funnels. The initial charge was heated to reflux while stirring. After 15 minutes of reflux, 20 g of heptane and 0.5 g of Vazo-67 were added over a period of 2 hours. At the end of the addition, the flask content was held at reflux for 2 hour. At the end of the hold period, the content was cooled to room temperature and the polymer solution was discharged. The heptane was added, adjusting the solids content to 50%.

Example 6

A mixture of silicone-acrylic copolymer from Example 2 (50 g), methyl MQ resin (20 g), catalyst $(NH_4)_2CO_3$ (0.5 g), and heptane (30 g) was stirred at 60° C. for 2 hr. The reaction mixture was then heated to reflux of heptane for 2 hr under a slow flow of nitrogen gas. Hexamethyldisilizane (2.0 g) was added and the reaction continued at reflux for 2 hr. The product was cooled to room temperature and packed in a glass jar.

Example 7

A mixture of silicone-acrylic copolymer from Example 2 (50 g), methyl MQ resin (20 g), catalyst NH$_4$OH(aq) (30% NH3, 0.2 g), and heptane (30 g) was stirred at reflux for 3 hr under a slow flow of nitrogen gas. Hexamethyldisilizane (2.0 g) was added and the reaction continued at reflux for 2 hr. The product was cooled to room temperature and packed in a glass jar.

Example 8

A mixture of silicone-acrylic copolymer from Example 1 (50 g), methyl MQ resin (20 g), catalyst KOH(aq) (0.1 g), and heptane (200 g) was stirred at 100° C. for 3 hr under a slow flow of nitrogen gas. Hexamethyldisilizane (2.0 g) was added and the reaction continued at reflux for 2 hr. The product was cooled to room temperature and packed in a glass jar.

Example 9

A mixture of silicone-acrylic copolymer from Example 3 (50 g), methyl MQ resin (20 g), catalyst KOH (0.1 g), and heptane (30 g) was stirred at 100° C. for 3 hr under a slow flow of nitrogen gas. Hexamethyldisilizane (2.0 g) was added and the reaction continued at reflux for 2 hr. The product was cooled to room temperature and packed in a glass jar.

Example 10

A mixture of silicone-acrylic copolymer from Example 4 (50 g), methyl MQ resin (20 g), catalyst KOH(aq) (30% NH3, 0.2 g), and heptane (30 g) was stirred at reflux for 3 hr under a slow flow of nitrogen gas. Hexamethyldisilizane (2.0 g) was added and the reaction continued at reflux for 2 hr. The product was cooled to room temperature and packed in a glass jar.

Example 11

A mixture of acrylic copolymer from Example 5 (50 g), silicone polymer (Wacker Elastomer 80 N, 50 g), catalyst KOH(aq) (1.0 N in water) (0.2 g), and heptane (300 g) was stirred at reflux for 4 hr under a slow flow of nitrogen gas. And then methyl MQ resin (50 g) and KOH(aq) (1.0 N in water) (0.1 g) were added and the mixture was stirred at reflux for 2 hr. Acetic acid (0.03 g) was added and the mixture was stirred at reflux for 0.5 hr. NH$_4$OH(aq) (30% NH3, 0.05 g) was added and the mixture was stirred at reflux for 0.5 hr. Hexamethyldisilizane (2.0 g) was added and the reaction continued at reflux for 1 hr. The heptane solvent was removed by rota-yap and the resulting hot melt adhesive was packed in a glass jar.

Example 12

A mixture of acrylic copolymer from Example 5 (50 g), silicone polymer (Wacker Elastomer 80 N, 50 g), catalyst KOH(aq) (1.0 N in water) (0.2 g), and heptane (300 g) was stirred at reflux for 4 hr under a slow flow of nitrogen gas. Acetic acid (0.03 g) was added and the mixture was stirred at reflux for 0.5 hr. The product was cooled to room temperature and packed in a glass jar.

Example 13

Comparative Example

A mixture of acrylic copolymer from Example 5 (50 g), silicone polymer (Wacker Elastomer 80 N, 50 g), methyl MQ resin (50 g), catalyst KOH(aq) (1.0 N in water) (0.2 g), and heptane (300 g) was stirred at reflux for 4 hr under a slow flow of nitrogen gas. Acetic acid (0.03 g) was added and the mixture was stirred at reflux for 0.5 hr. Hexamethyldisilizane (5.0 g) was added and the reaction continued at reflux for 1 hr. The product was cooled to room temperature and packed in a glass jar.

Example 14

A mixture of acrylic copolymer from Example 5 (50 g), silicone polymer (Wacker Elastomer 80 N, 50 g), catalyst KOH(aq) (1.0 N in water) (0.2 g), and heptane (300 g) was stirred at reflux for 4 hr under a slow flow of nitrogen gas. Acetic acid (0.03 g) was added and the mixture was stirred at reflux for 0.5 hr. NH$_4$OH(aq) (30% NH3, 0.2 g) and then methyl MQ resin (50 g) were added and the mixture was stirred at reflux for 3 hr. Hexamethyldisilizane (5.0 g) was added and the reaction continued at reflux for 1 hr. The product was cooled to room temperature and packed in a glass jar.

Example 15

A mixture of acrylic copolymer from Example 5 (50 g), silicone polymer (Wacker Elastomer 80 N, 50 g), catalyst KOH(aq) (1.0 N in water) (0.2 g), and heptane (300 g) was stirred at reflux for 4 hr under a slow flow of nitrogen gas. (NH$_4$)$_2$CO$_3$ (0.5 g) and then methyl MQ resin (50 g) were added and the mixture was stirred at 60 C for 3 hr and then reflux for 1 hr. Hexamethyldisilizane (5.0 g) was added and the reaction continued at reflux for 1 hr. The product was cooled to room temperature and packed in a glass jar.

Example 16

An initial charge containing 24.5 g of 2-EHA, 0.5 g of trimethoxysilylpropylacrylate, 50.0 g of silicone polymer (Wacker Elastomer 80 N), 0.03 g of Vazo-67, and 250.0 g of heptane was mixed and charged to a 1-L 4-neck round bottom flask equipped with stainless steel stirrer, thermometer, condenser, water bath, and slow addition funnels. The initial charge was heated to reflux while stirring. After 15 minutes of reflux, 50 g of heptane and 0.5 g of Vazo-67 were added over a period of 2 hours. At the end of the addition, 0.2 g of KOH(aq) (1.0 N in water) was added and the mixture was stirred at reflux for 4 hour. Acetic acid (0.03 g) was added and the mixture was stirred at reflux for 0.5 hr. NH$_4$OH(aq) (30% NH3, 0.2 g) and then methyl MQ resin (50 g) were added and the mixture was stirred at reflux for 4 hr. Hexamethyldisilizane (5.0 g) was added and the reaction continued at reflux for 1 hr. The product was cooled to room temperature and packed in a glass jar.

Example 17

An initial charge containing 24.5 g of 2-EHA, 0.5 g of trimethoxysilylpropylacrylate, 50.0 g of silicone polymer (Wacker Elastomer 80 N), 0.03 g of Vazo-67, and 250.0 g of heptane was mixed and charged to a 1-L 4-neck round bottom flask equipped with stainless steel stirrer, thermometer, condenser, water bath, and slow addition funnels. The initial charge was heated to reflux while stirring. After 15 minutes of reflux, 50 g of heptane and 0.5 g of Vazo-67 were added over a period of 2 hours. At the end of the addition, 0.2 g of KOH(aq) (1.0 N in water) was added and the mixture was stirred at reflux for 4 hour. $(NH_4)_2CO_3$ (0.5 g), $NaHCO_3$ (0.1 g) and methyl MQ resin (50 g) were added and the mixture was stirred at 60 C for 3 hr and then reflux for 1 hr. Hexamethyldisilizane (5.0 g) was added and the reaction continued at reflux for 1 hr. The product was cooled to room temperature and packed in a glass jar.

Example 18

An initial charge containing 24.5 g of 2-EHA, 0.5 g of trimethoxysilylpropylacrylate, 0.03 g of Vazo-67, and 50.0 g of heptane was mixed and charged to a 1-L 4-neck round bottom flask equipped with stainless steel stirrer, thermometer, condenser, water bath, and slow addition funnels. The initial charge was heated to reflux while stirring. After 15 minutes of reflux, 50 g of heptane and 0.5 g of Vazo-67 were added over a period of 2 hours. At the end of the addition, 50.0 g of silicone polymer (Wacker Elastomer 80 N), 0.2 g of KOH(aq) (1.0 N in water) and 200 g of heptane were added and the mixture was stirred at reflux for 4 hour. Acetic acid (0.03 g) was added and the mixture was stirred at reflux for 0.5 hr. $NH_4OH(aq)$ (30% NH3, 0.2 g) and methyl MQ resin (50 g) were added and the mixture was stirred at reflux for 4 hr. Hexamethyldisilizane (5.0 g) was added and the reaction continued at reflux for 1 hr. The product was cooled to room temperature and packed in a glass jar.

Example 19

The GPC Chromatograms (Waters Alliance 2695 GPC) of silicone polymer (Wacker Elastomer 80 N) ( . . . ) acrylic polymer (Example 5) (----), and the silicone-acrylic copolymer of Example 12 (—) are shown in FIG. 1.

FIG. 1 shows that the silicone-acrylic copolymer has higher molecular weight than the individual polymers, indicating the formation of a silicone-acrylic copolymer.

Example 20

GPC Graph

The GPC chromatograms (Waters Alliance 2695 GPC) of the adhesives made from (1) silicone-acrylic copolymer with MQ resin, Example 14 (----) and (2) silicone polymer, acrylic polymer and MQ resin, Example 13 (—) are shown in FIG. 2.

FIG. 2 shows that the two adhesives have different GPC characteristics. The adhesive made from the silicone-acrylic copolymer (Example 14) has a broader and higher molecular weight distribution and peaks than the adhesive made from Example 13.

Example 21

Photograph

The above samples from Example 20 were photographed with a Sony Cyber-Shot DSC-S85, 4.0 Mega Pixels.

The silicone-acrylic hybrid adhesive of the invention (Example 14) is a clear solution in heptane (left). The adhesive of Example 13 is opaque solution in heptane. This adhesive is thermodynamically unstable and will ultimately lead to microscopic or even macroscopic phase separation over time.

Many modifications and variations of this invention can be made without departing from its spirit and scope, as will be apparent to those skilled in the art. The specific embodiments described herein are offered by way of example only, and the invention is to be limited only by the terms of the appended claims, along with the full scope of equivalents to which such claims are entitled.

The invention claimed is:

1. A silicone-acrylic copolymer comprising a reaction product of:
   (a) a silicone polymer;
   (b) (i) a mixture of acrylic monomers and a radical initiator, wherein at least one acrylic monomer comprises a silane (meth)acrylic monomer and/or a siloxane (meth)acrylic macromer; or (ii) an acrylic polymer which comprises a silane or a siloxane functional group; and
   (c) a scrambling catalyst;
   wherein the ratio of (a) to (b) is from 50:1 to 1:50.

2. The silicone-acrylic copolymer of claim 1 wherein the silicone polymer is an organodisubstituted polysiloxane which is end-capped with a hydroxyl functional group, alkoxy functional group, hydride functional group, vinyl functional group or mixtures thereof.

3. The silicone-acrylic copolymer of claim 2 wherein the silicone polymer has an average molecular weight of from about 100 g/mol to 2,000,000 g/mol.

4. The silicone-acrylic copolymer of claim 1 wherein the silane (meth)acrylic monomer and/or the siloxane (meth)acrylic macromer is in the content of about 0.2 to about 50 wt %, based on the total weight of acrylic monomers.

5. The silicone-acrylic copolymer of claim 4 wherein the silane (meth)acrylic monomer is selected from the group consisting of dialkoxysilyl (meth)acrylates, trialkoxylsilyl (meth)acrylates, and mixtures thereof; and the siloxane (meth)acrylic macromer is a polydimethylsiloxane mono (meth)acrylate.

6. The silicone-acrylic copolymer of claim 1, in which the acrylic polymer is prepared with at least one silane (meth)acrylic monomer and/or a siloxane (meth)acrylic macromer.

7. The silicone-acrylic copolymer of claim 1, in which the acrylic polymer is end-capped with an alkoxysilyl functional group which is selected from trimethoxylsilyl group, dimethoxymethylsilyl group, triethoxylsilyl group, diethoxymethylsilyl group or mixtures thereof.

8. The silicone-acrylic copolymer of claim 1 wherein the scrambling catalyst has a pKa value equal to or less than −6 or equal to or greater than 15.

9. The silicone-acrylic copolymer of claim 1 wherein the scrambling catalyst is selected from the group consisting KOH, NaOH, LiOH, organolithium reagents, Grignard reagents, acidic clay, acidic ion exchange resins, and mixtures thereof.

10. A composition comprising the silicone-acrylic copolymer of claim 1 further comprising a tackifier, silicone resin, solubilizing agents, polyester, polyether, polyurethane, natural rubber, synthetic rubber, antioxidant, viscosity modifying agent, filler or mixtures thereof.

11. The composition of claim 10 wherein the silicone resin comprises at least one tetrafunctional siloxyl unit $SiO_{4/2}$ and at least one triorganosiloxy unit $R_3SiO_{1/2}$, wherein the R is methyl, hydroxyl, vinyl, phenyl, (meth)acryloxy or mixtures thereof, and the mole ratio of the units $SiO_{4/2}$ to $R_3SiO_{1/2}$ is from 1:2 to 2:1.

12. The composition of claim 11 wherein the R is from about 0.05 wt % to 10 wt % based on the total weight of the silicone resin.

13. An article comprising the silicone-acrylic copolymer of claim 1.

14. The article of claim 13 which is a coating, sealant or adhesive.

15. The article of claim 14 wherein the adhesive is a solution adhesive, emulsion adhesive or a hot melt adhesive.

16. A method of preparing a silicone-acrylic copolymer of claim 1 comprising combining the silicone polymer, the mixtures of acrylic monomers with the radical initiator or the acrylic polymer, the scrambling catalyst, a solvent and heating and refluxing at the solvent refluxing temperature.

17. The method of preparing a silicone-acrylic copolymer of claim 16 wherein the solvent is selected from the group consisting of water, aliphatic hydrocarbons, aromatic hydrocarbon, ether, tetrahydrofuran, ethyl acetate, methyl ethyl ketone, and mixtures thereof.

* * * * *

UNITED STATES PATENT AND TRADEMARK OFFICE
CERTIFICATE OF CORRECTION

PATENT NO. : 8,664,329 B2
APPLICATION NO. : 13/617968
DATED : March 4, 2014
INVENTOR(S) : Yuxia Liu It is certified that error appears in the above-identified patent and that said Letters Patent is hereby corrected as shown below:

In the specification,

Column 9, line 37: Change "KOH(aq)" to -- $NH_4OH\ (aq)$ --.

Column 9, line 55: Change "rota-yap" to -- rota-vap --.

Signed and Sealed this
First Day of March, 2016

Michelle K. Lee
*Director of the United States Patent and Trademark Office*